(No Model.)  2 Sheets—Sheet 1.
C. W. SLEEPER.
CAN SOLDERING MACHINE.
No. 372,872.  Patented Nov. 8, 1887.
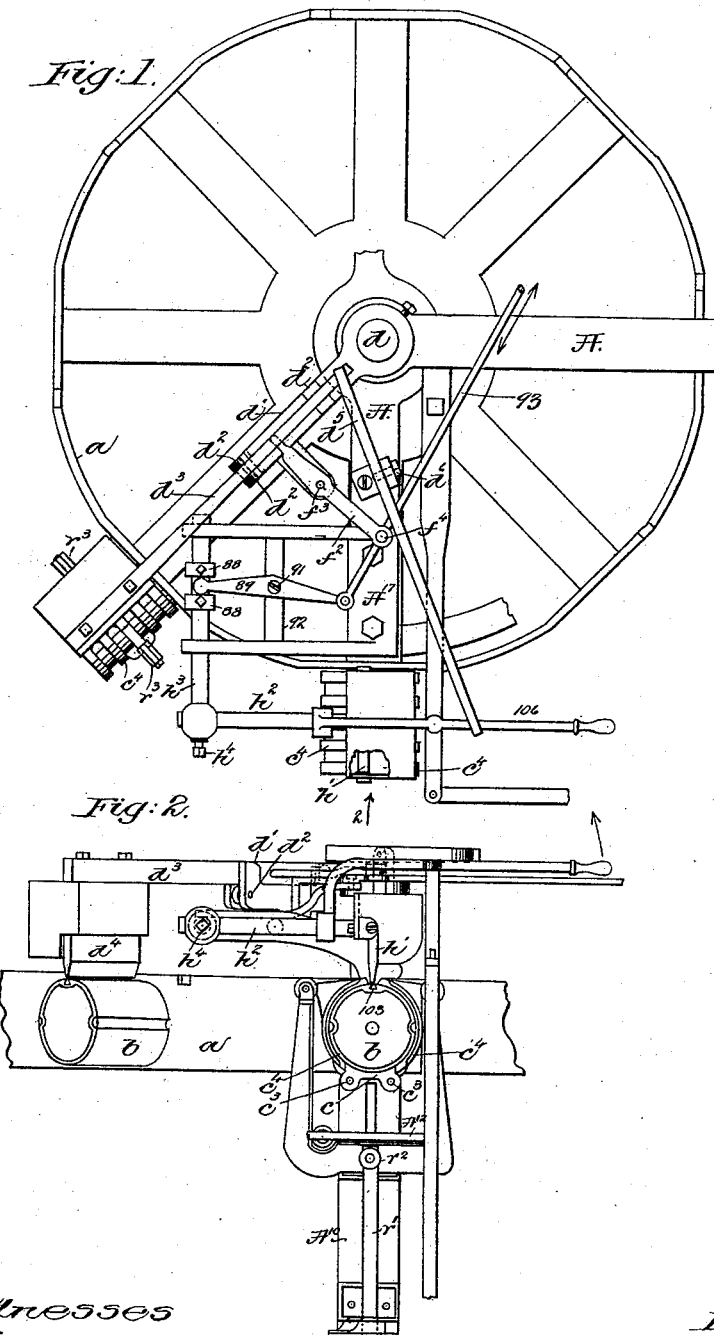
Witnesses
Fred L. Emery
John F. C. Primblett
Inventor:
Charles W. Sleeper
by Crosby & Gregory
Attys.

(No Model.) 2 Sheets—Sheet 2.
C. W. SLEEPER.
CAN SOLDERING MACHINE.
No. 372,872. Patented Nov. 8, 1887.
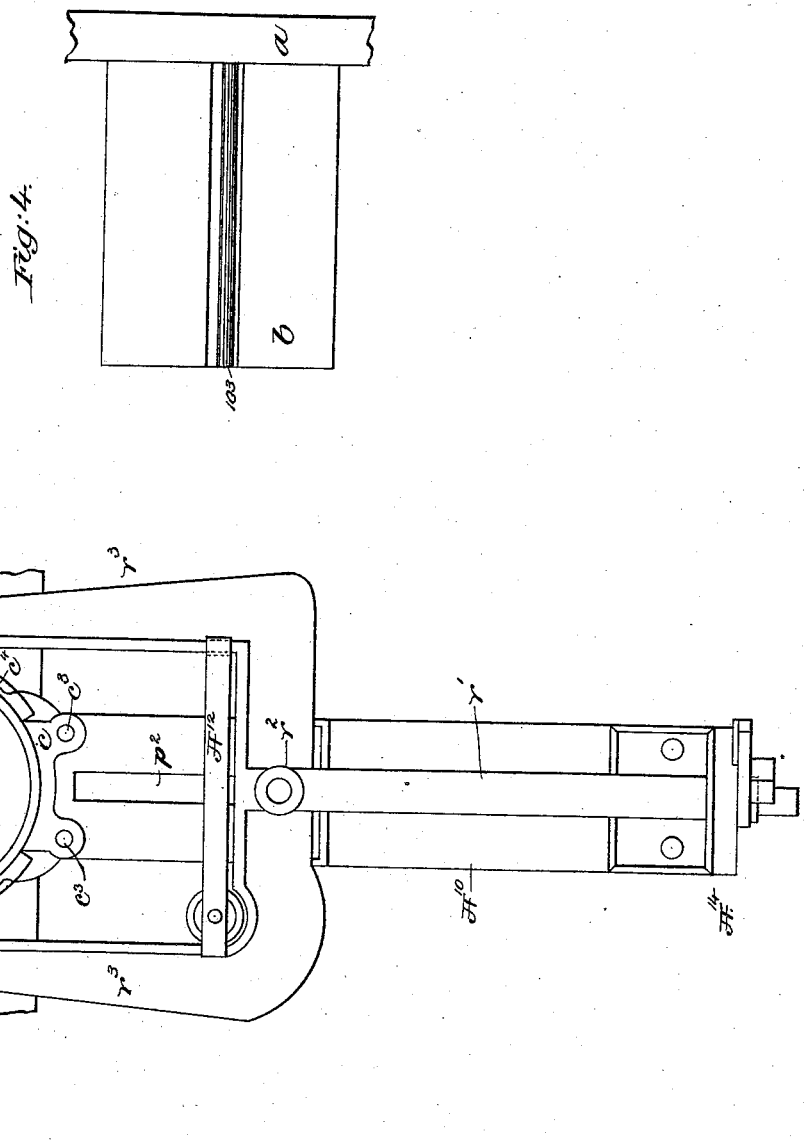
Witnesses.
Inventor.
Charles W. Sleeper
by Ormsby Gregory
attys.

UNITED STATES PATENT OFFICE.

CHARLES W. SLEEPER, OF COATICOOK, QUEBEC, CANADA, ASSIGNOR TO THE AUTOMATIC CAN MACHINE COMPANY, OF BOSTON, MASSACHUSETTS.

CAN-SOLDERING MACHINE.

SPECIFICATION forming part of Letters Patent No. 372,872, dated November 8, 1887.

Application filed April 14, 1887. Serial No. 234,766. (No model.)

*To all whom it may concern:*

Be it known that I, CHARLES W. SLEEPER, of Coaticook, Province of Quebec, Canada, have invented an Improvement in Can-Soldering Machines, of which the following description, in connection with the accompanying drawings, is a specification, like letters on the drawings representing like parts.

The machine herein to be described is an improvement upon that described in application, Serial No. 214,533, filed September 25, 1886.

My present invention has for its object to improve the quality of the longitudinal seam of the can-body. In practice I have discovered that the seam may be better made or be more close and serviceable, provided the seam is, as it is called, "sweated"—that is, the soldering-iron kept upon it for a considerable length of time.

The invention relates to a can-soldering machine wherein the bodies are held upon mandrels extending from a rotating bed or table, the mandrels with can-bodies thereon arriving in succession under the soldering-iron, where they are held for a limited space of time, when they are moved to another position, the different steps in the process of manufacturing the can-body being carried on in succession. To enable the sweating to be done without interfering with the other operations to which the can-body is subjected when it is being made, and without decreasing the speed of manufacture, I have provided the machine with two soldering-irons and actuating mechanism, one of the said soldering-irons acting to melt the solder-wire upon the can-body and solder the seam, the other iron acting to sweat the seam.

Another feature of my invention herein contained consists in providing the jaws which co-operate with the mandrel about which the sheet of tin for the can-body is wrapped with the metal aluminum. I have also provided the mandrel with aluminum to prevent the adhesion of solder to it, I having found in practice that solder will not adhere to the metal aluminum.

Figure 1 represents a sufficient portion of a can-soldering machine such as shown in my said application to enable one conversant with the art to understand the same. Fig. 2 is a partial elevation of Fig. 1, looking at it in the direction of the arrow 2. Fig. 3 is an enlarged front elevation of a part of the rotating carrier, a mandrel and jaws, and means to close the jaws; and Fig. 4 is a top or plan view of a part of the carrier with a mandrel extending from it chiefly to show the aluminum strip therein.

Referring to the drawings, the carrier $a$, the mandrels $b\ b$, projecting therefrom, the soldering-irons $h'$, the rod $h^2$, to which it is secured, the rock-shaft $h^3$, the screw $h^4$, the bracket $A^{17}$, in which the rock-shaft $h^3$ slides, the collars 88 on the rock-shaft $h^3$, the lever 89, pivoted at 91, rod 93, attached to the outer end of the lever 89, to move the latter in order that it may slide the soldering-iron longitudinally in contact with the can-body, the guide $A^{10}$, connected to the carrier $a$, its foot $A^{14}$, the yoke $r^2$, having arms $r^3$ and shank $r'$, the guide $A^{12}$ for the yoke, the former to co-operate with the mandrel $b$ and clamp the tin about the mandrel and overlap the edges of the tin, the said "former" being composed of a center piece, $c$, and two jaws, $c^4$, pivoted thereon at $c^3$, and the rod $p^2$, to lift the center piece, $c$, and rolls $c^7$, and projections $c^5$ are the same as in my said application, wherein the same parts are designated by like letters, all the said parts being herein operated as therein fully described.

The spindle $d$, about which the carrier $a$ rotates, has fixed to it an arm, $d'$, provided with lugs $d^2$, to form a guide for a lever, $d^3$, provided with an auxiliary soldering or sweating iron, $d^4$, the weight of the said iron being sufficient to enable it to descend by gravity upon the can-body previously soldered together when the said can-body, held between the mandrel and the former, is in the rotation of the carrier brought under the said iron $d^4$.

The arm $d'$ has a roller on which the lever $d^3$ bears as a fulcrum. The lever $d^3$ is engaged by the end of the intermediate lever, $f^2$, pivoted at $f^3$ on a bracket attached to the framework, as in Figs. 1 and 2, the said lever $f^2$ being pivoted to the rod 93, as at $f^4$, so that the lever $d^3$ and its attached auxiliary soldering-iron will be moved longitudinally or be reciprocated on the can-body at the same time that the iron $h'$ is reciprocated, as provided for in the said application. The rear end of the lever $d'$ is acted upon by a lever, $d^5$, pivoted at $d^6$, the upper end of the said lever being acted upon by the hand-lever 106, attached to the rod $h^2$, so that when the said hand-lever is lifted to lift the arm $h^2$ and the soldering-iron $h'$ the auxiliary soldering or sweating iron $d^4$ is also lifted, the two irons thus working in unison.

In practice the iron $h'$ melts the solder-wire or solder upon the overlapped edges of the can-body while the body is held between the former and the mandrel, the soldering-iron at the same time having imparted to it, preferably, a longitudinal motion, to thus rub the solder into the seam. Then the handle 106 is lifted, bringing the mandrel having upon it the can-body which has been soldered underneath the auxiliary soldering or sweating iron $d^4$, when the latter is permitted to descend upon the previously-soldered seam, smoothing it or sweating it, as it is called, or causing the seam to be securely closed. This sweating of the soldered seam, as it is called, makes a more secure and a tighter, closer seam than can usually be done with a single soldering process without great care is used and considerable time is taken in the operation.

The mandrel at a point immediately below where the edges of the sheet of tin forming the can-body are overlapped is provided with a strip or block, 103, of aluminum, and so, also, the edges of the jaws holding the overlapped edges of the sheet of tin in position to be soldered are covered or tipped with aluminum, as at 162. (See Fig. 3.)

Great difficulty has been experienced in can-soldering machines by the sticking of the solder to the edges of the jaws of the former, and also to the mandrel, and many different plans have been tried to obviate this difficulty.

It is quite important for the best results that the overlapped edges of the sheet of tin being soldered should be held as closely as possible to the overlapping edges of the sheet, and to enable this to be done the edges of the jaws, which should come substantially up to the soldering-iron, must be made from a material to which solder will not adhere, and the only material known to me to which solder will not adhere is aluminum.

Prior to my invention I am aware that steel and stone and other materials have been employed as a means to prevent the adhesion of solder; but in my experiments neither of these materials has been found practicable.

By providing the jaws with a solder-resisting edge a can-soldering machine can be run at greatly-increased speed.

In my experiments looking toward the production of a practical can-soldering machine I was met with what seemed for a long time to be an insurmountable difficulty—viz., the difficulty arising from the adhesion of the solder to the jaws employed to clamp together and hold the overlapped edges of the sheet of tin upon the mandrel or device to determine the diameter of the can-body—for in practice the solder accumulated on the said jaws so fast as to prevent the machine being used. To overcome this difficulty I tried very many substances, hoping to find some material in which solder would not accumulate, and after very considerable trouble and expense I finally tried the comparatively-rare metal known as "aluminum," and with most beneficial results; and since combining with the jaws a facing or end of aluminum I find no difficulty in doing the work rapidly and well, and in the course of my experiments I failed to find any other metal or substance which could be used practically for the purpose stated.

I claim—

1. In a can-soldering machine, a carrier and two mandrels and formers for holding can-bodies thereon to be soldered, combined with two soldering irons, one acting to melt the solder on the can-body and the other to sweat the seam, substantially as described.

2. The combination, with a soldering-iron, of jaws or formers provided with aluminum to prevent the accumulation of solder on the said jaws or formers when soldering the can-body, substantially as described.

3. The combination, with the carrier and mandrels provided with a strip of aluminum, as at 103, and a soldering-iron, of jaws or formers provided with aluminum to prevent the accumulation of solder on the said jaws or formers when soldering the can-body, substantially as described.

In testimony whereof I have signed my name to this specification in the presence of two subscribing witnesses.

CHARLES W. SLEEPER.

Witnesses:
 BERNICE J. NOYES,
 F. L. EMERY.